(12) United States Patent
Zou et al.

(10) Patent No.: US 11,621,122 B2
(45) Date of Patent: Apr. 4, 2023

(54) INDUCTOR STRUCTURE AND FABRICATING METHOD THEREOF

(71) Applicant: HUAWEI TECHNOLOGIES CO., LTD., Guangdong (CN)

(72) Inventors: Peng Zou, Shenzhen (CN); Xiaojuan Cui, Shenzhen (CN); Tao Xiong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 513 days.

(21) Appl. No.: 16/797,374

(22) Filed: Feb. 21, 2020

(65) Prior Publication Data

US 2020/0194168 A1 Jun. 18, 2020

Related U.S. Application Data

(63) Continuation of application No. PCT/CN2017/098240, filed on Aug. 21, 2017.

(51) Int. Cl.
*H01F 27/32* (2006.01)
*H01F 27/28* (2006.01)
*H01F 41/04* (2006.01)

(52) U.S. Cl.
CPC ....... *H01F 27/324* (2013.01); *H01F 27/2804* (2013.01); *H01F 41/046* (2013.01)

(58) Field of Classification Search
None
See application file for complete search history.

(56) References Cited

U.S. PATENT DOCUMENTS 6,160,688 A * 12/2000 Okumura .................. G11B 5/39
7,247,542 B2 7/2007 Shie
(Continued)

FOREIGN PATENT DOCUMENTS

CN 104425122 A 3/2015
CN 105097789 A 11/2015
(Continued)

OTHER PUBLICATIONS

Office Action issued in Chinese Application No. 201780093989.7 dated Aug. 27, 2020, 13 pages (With English Translation).
(Continued)

*Primary Examiner* — Jared Fureman
*Assistant Examiner* — Aqeel H Bukhari
(74) *Attorney, Agent, or Firm* — Fish & Richardson P.C.

(57) ABSTRACT

The present disclosure relates to inductor structures and fabricating methods. One example inductor structure includes a first magnetic material layer, an insulation layer, where the insulation layer comprises a polymer structure with longitudinal length which greater than lateral length, the polymer structure comprises an arched upper surface, a first side surface, a second side surface, a bottom surface in a longitudinal direction, at least one of a corner between the arched upper surface and the first side surface and a corner between the arched upper surface and the second side surface is a rounded corner, and at least one of an angle formed between the first side surface and the bottom surface and an angle formed between the second side surface and the bottom surface is less than 90 degree, at least one conductive wire structure passing through the insulation layer, and a second magnetic material layer.

20 Claims, 9 Drawing Sheets

(56) References Cited

U.S. PATENT DOCUMENTS

| | | | |
|---|---|---|---|
| 8,361,594 B2 | 1/2013 | Gardner et al. | |
| 2008/0003760 A1 | 1/2008 | Gardner et al. | |
| 2012/0087179 A1* | 4/2012 | Jung | G11C 11/161 365/158 |
| 2014/0339653 A1 | 11/2014 | Chang et al. | |
| 2015/0097267 A1 | 4/2015 | Tseng et al. | |
| 2017/0294504 A1* | 10/2017 | Deligianni | H01F 41/042 |
| 2018/0308612 A1* | 10/2018 | Park | H01F 27/292 |

FOREIGN PATENT DOCUMENTS

| | | |
|---|---|---|
| CN | 106876372 A | 6/2017 |
| CN | 106910609 A | 6/2017 |

OTHER PUBLICATIONS

Morrow et al., "Design and Fabrication of On-Chip Coupled Inductors Integrated With Magnetic Material for Voltage Regulators," IEEE Transactions on Magnetics, vol. 47, No. 6, Jun. 2011, pp. 1678-1686.

Chomnawang et al., "Three-dimensional micromachined on-chip inductors for high frequency applications," Louisianna State University, LSU Doctoral Dissertation, Dec. 2002, 196 pages.

PCT International Search Report and Written Opinion issued in International Application No. PCT/CN2017/098240 dated May 31, 2018, 9 pages.

\* cited by examiner

INDUCTOR STRUCTURE AND FABRICATING METHOD THEREOF

CROSS-REFERENCE TO RELATED APPLICATIONS

This application is a continuation of International Application No. PCT/CN2017/098240, filed on Aug. 21, 2017, which is hereby incorporated by reference in its entirety.

TECHNICAL FIELD

The application relates to an electronics fabrication technology, and more particularly relates to an inductor structure and a fabricating method thereof.

BACKGROUND

Inductors and transformers are essential components of microelectronic circuits such as switching voltage regulators, radio frequency (RF) circuits, and Electro Magnetic Interference (EMI) mitigation circuits, etc. As microelectronic systems advance toward higher integration and complexity within continuously decreased form factor, it is of great importance to realize high inductance over a miniaturized footprint. In that case, inductors and transformers can achieve the necessary on-die or on-package integration to realize a high-performance circuit, such as an integrated voltage regulator, etc. An effective way of achieving high inductance of an integrated inductor or transformer is to use a stripline-type magnetic thin film inductor, which has two magnetic thin film layers (lower and upper layers) wrapping around cylindrical insulation material, and metal wires pass through the cylindrical insulation material.

However, it is difficult to fabricate such structures in a semiconductor process due to limitations of planar process techniques.

Thus, how to provide an integrated inductor structure with a high inductance effectively is a problem needs to be solved.

SUMMARY

Embodiments of the present application provide an inductor structure and a fabricating method thereof, which provides an inductor structure with a high inductance effectively.

In a first aspect, present application provides an inductor structure. The inductor structure includes a first magnetic material layer; an insulation layer formed on the first magnetic material layer; at least one conductive wire structure, which passes through the insulation layer; and a second magnetic material layer, formed on the insulation layer. The insulation layer includes a polymer structure of which a longitudinal length is greater than a lateral length, and the polymer structure includes an arched upper surface, a first side surface, a second side surface, and a bottom surface in a longitudinal direction. At least one of a corner between the arched upper surface and the first side surface and a corner between the arched upper surface and the second side surface is a rounded corner, and at least one of an angle formed between the first side surface and the bottom surface and an angle formed between the second side surface and the bottom surface is less than 90 degree.

According to embodiments of the present application, the inductor structure has two magnetic material layers supported by a long trapezoid like prism structure, which can realize a high inductance. In addition, the long trapezoid like prism structure has an arched upper surface and rounded corner transition, and the bottom surface is less than 90 degree, which ensures smooth film deposition and magnetic characteristics, and thus the high inductance of an integrated inductor or transformer is achieved effectively.

In a second aspect, present application provides an inductive device. The inductive device includes at least one inductor structure of the first aspect.

In a third aspect, present application provides a method of forming an inductor structure. The method includes: forming a first magnetic material layer; forming a first photoresist layer, through which at least one conductive wire structure passes, over the first magnetic material layer; performing a pattern definition with lithography on the first photoresist layer; coating a second photoresist layer over the at least one conductive wire structure passes and the dielectric layer; developing the first photoresist layer and the second photoresist layer; forming a second magnetic material layer on the insulation layer.

According to a first implementation of third aspect, the method further includes performing settlement for a first preset duration after coating the second photoresist layer and before developing.

According to a second implementation of third aspect, the method further includes forming a dielectric layer on the first magnetic material layer, wherein the forming a first photoresist layer, through which at least one conductive wire structure passes, over the first magnetic material layer includes: forming at least one conductive wire structure passes on the dielectric layer, coating a first photoresist layer over the at least one conductive wire structure passes and the dielectric layer.

In a fourth aspect, present application provides a method of forming an inductor structure. The method includes forming a first magnetic material layer; forming an insulation layer, through which at least one conductive wire structure passes, on the first magnetic material layer, wherein the insulation layer includes a polymer structure of which a longitudinal length is greater than a lateral length, and the polymer structure includes an arched upper surface, a first side surface, a second side surface, a bottom surface in a longitudinal direction, wherein at least one of a corner between the arched upper surface and the first side surface and a corner between the arched upper surface and the second side surface is a rounded corner, and at least one of an angle formed between the first side surface and the bottom surface and an angle formed between the second side surface and the bottom surface is less than 90 degree; and forming a second magnetic material layer on the insulation layer.

According to a first implementation of fourth aspect, the forming an insulation layer, through which at least one conductive wire structure passes, on the first magnetic material layer includes: forming an insulation layer, through which at least one conductive wire structure passes, on the first magnetic material layer; forming a first photoresist layer, through which at least one conductive wire structure passes, over the first magnetic material layer; performing a pattern definition with lithography on the first photoresist layer; coating a second photoresist layer over the at least one conductive wire structure passes and the dielectric layer; developing the first photoresist layer and the second photoresist layer.

According to a first implementation of fourth aspect, the method further includes: performing settlement for a first preset duration after coating the second photoresist layer and before developing.

According to a second implementation of fourth aspect, the method further includes: forming a dielectric layer on the first magnetic material layer, wherein the forming a first photoresist layer, through which at least one conductive wire structure passes, over the first magnetic material layer includes forming at least one conductive wire structure passes on the dielectric layer, coating a first photoresist layer over the at least one conductive wire structure passes and the dielectric layer.

In some implementations, the rounded corner is convex and/or portions of the first side surface and the second side surface close to the bottom surface are concave, which ensures smooth film deposition and magnetic characteristics.

In some implementations, a ratio of bottom width to height of a cross section of the polymer structure is greater than or equal to 3.

In some implementations, the height of the cross section is greater than or equal to 10 μm.

In some implementations, the polymer structure has a glass transition temperature greater than 200 degree Celsius after polymerization In some implementations, a footprint of the insulation layer has a ratio of length to width greater than or equal to 1.5.

In some implementations, a radius of the arched upper surface is at least 4 times greater than a radius of the at least one rounded corner. With the increased radius ratio between top surface and rounded corner, the top surface possesses less steep transition from the highest point toward the edge. Therefore, the effect of the gravitational force upon magnetic anisotropy can be greatly reduced. This is to ensure the desired magnetization polarity of magnetic material layer.

In some implementations, a profile of the arched upper surface is one of a segmental arc and an elliptical arc.

In some implementations, the polymer structure is made of cured photoresist material, and the polymer structure is fabricated by forming a first photoresist layer, through which at least one conductive wire structure passes, over the first magnetic material layer; performing a pattern definition with lithography on the first photoresist layer; coating a second photoresist layer over the at least one conductive wire structure passes and the dielectric layer; performing settlement for a first preset duration after coating the second photoresist layer; developing the first photoresist layer and the second photoresist layer.

In some implementations, the first preset duration ranges from 1 hour to 3 hours to allow sufficient diffusion of photo-acid molecules, produced by the selectively exposed portion on the first photoresist layer, toward unexposed region of the first photoresist layer and second layer of photoresist.

In some implementations, the dielectric layer is made of cured photoresist material.

DESCRIPTION OF EMBODIMENTS

Figure 1:
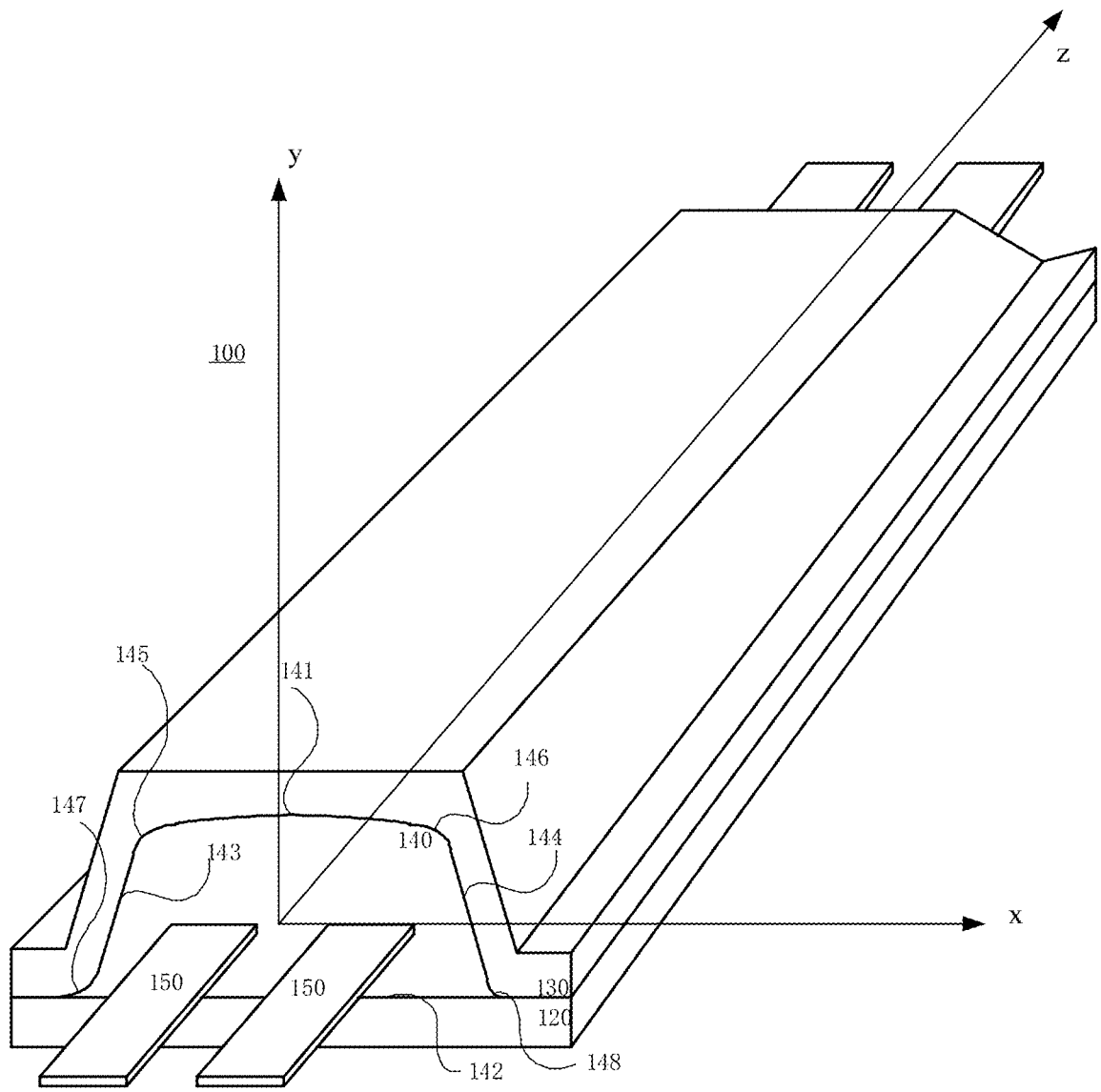
FIG. 1 is a structural diagram of an inductor structure according to an embodiment of the present application.

It should be noted that, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

When fabricating an inductor structure with two magnetic thin film layers, a lower magnetic thin film may be formed on a substrate, then a long mesa insulation structure or layer, through which a conductive wire structure passes, may be formed on the lower magnetic thin film, and an upper magnetic thin film may be sputtered onto the long mesa insulation structure. Such insulation structure may be made of polymerized photoresist. Therefore, the lower and upper magnetic thin film layers may form a tube that is structurally supported by the long mesa insulation structure, for example, a cylindrical insulation structure. A conventional method is to utilize thermal reflow to deform a rectangular polymerized photoresist structure to obtain the cylindrical insulation structure. However, the polymerized photoresist has to be less thermal stable to enable easy deformation at relatively low temperature. For photoresist material with high thermal stability, this method becomes very ineffective. Additionally, commercial products with such integrated micro inductors also require that such polymer possesses high temperature stability from reliability perspective. Thus, it is difficult to fabricate such a 3D curved polymer structure.

In addition, to be compatible with a commercial semiconductor fabrication process, the insulation structure between the two magnetic thin film layers may be a trapezoid like prism structure with rounded corners to ensure smooth film deposition and magnetic characteristics, while the lower magnetic thin film can be fabricated as a flat layer.

The embodiments of the present application address the challenges of fabricating an insulation structure with an arched cross-sectional profile, for example, using higher thermal stable insulation material. Certainly, the embodiments of the present application may use the less thermal stable insulation material. Particularly, the embodiments of the present application provide a method for fabricating a long trapezoidal polymer prism structure, and the resulted polymer prism structure possesses an arched upper or curved top surface and rounded corner transitions. Such polymer prism structure may form a foundation to realize an integrated micro inductor or transformer on a silicon die or wafer.

Embodiments of the present application may employ a lithography, which is also called photolithography, photomasking, masking, photoetching processing, or microlithography. The photolithography, also termed optical lithography or Ultraviolet (UV) lithography, is a process used in microfabrication. It uses light to transfer a geometric pattern from a photomask to a light-sensitive or photosensitive chemical "photoresist", or simply "resist," on the substrate.

FIG. 1 is a structural diagram of an inductor structure 100 according to an embodiment of the present application. For example, the inductor structure 100 may refer to an inductor. The embodiments of the present application are not limited thereto, for example, the inductor structure may also be a transformer, or other devices having an electromagnetic induction structure.

Referring to FIG. 1, the inductor structure 100 may include a first magnetic material layer 120, a second magnetic material layer 130, and an insulation layer 140 formed between the first magnetic material layer 120 and the second magnetic material layer 130. For example, the insulation layer 140 may be formed by depositing one type of material, or more than one type of materials in multi-step process. The inductor structure 100 may further include at least one conductive wiring structure 150 which extends between the first magnetic material layer 120 and the second magnetic material layer 130 and passes through the insulation layer 140.

Referring to FIG. 1, coordinate axis z indicates a longitudinal direction of the inductor structure 100 and coordinate axis x indicates a lateral direction of the inductor structure 100. The insulation layer 140 includes a polymer structure of which a longitudinal length is greater than a lateral length, and the polymer structure may include an arched upper or top surface 141, a first side surface or wall 143, a second side surface or wall 144, a bottom surface 142 in a longitudinal direction, wherein at least one of a corner 145 between the arched upper surface 141 and the first side surface 143 and a corner 146 between the arched upper surface 141 and the second side surface 144 is a rounded corner, and at least one of an angle formed between the first side surface and the bottom surface and an angle formed between the second side surface and the bottom surface is less than 90 degree.

For example, the insulation layer 140 may be a long trapezoid like prism structure, for example, a long mesa structure with an arched cross-sectional profile. Both corners 145 and 146 are rounded corner and both the angle formed between the first side surface and the bottom surface and the angle formed between the second side surface and the bottom surface are less than 90 degree.

According to embodiments of the present application, the inductor structure has two magnetic material layers supported by a long trapezoid like prism structure, which can realize a high inductance. In addition, the long trapezoid like prism structure has an arched upper surface and rounded corner transition, and the bottom surface is less than 90 degree, which ensures smooth film deposition and magnetic characteristics, and thus the high inductance of an integrated inductor or transformer is achieved effectively.

Optionally, as another embodiment, the rounded corner is convex. For example, both corners 145 and 146 are convex upward.

Optionally, as another embodiment, a portion 147 of the first side surface close to the bottom surface and a portion 148 of the second side surface close to the bottom surface are concave downward.

According to the embodiments of the present application, the polymer structure may be made of cured photoresist.

According to embodiments of the present application, a cross section of the insulation layer is trapezoidal and has an arched upper profile.

According to embodiments of the present application, the trapezoidal like insulation micro-structure may have a bottom width in the range between 100 μm and 300 μm to enable a sufficiently wide metal conductor or multiple sufficiently wide metal conductors being enclosed. The purpose of including sufficiently wide metal conductor, e.g. copper wiring, is to ensure the resulted inductor possesses meaningfully low Direct Current (DC) resistance, thus low DC loss, especially when such inductor is used as energy storage device in voltage regulator circuit. Meanwhile, to facilitate manufacturability of the trapezoidal insulation structure using available semiconductor wafer processing machines, techniques, and materials, the height of such insulation structure is limited to the range between 10 μm and 40 μm. For the same reason of realizing low DC resistance of the resulted inductor, the height range of the insulation structure enables the fabrication of metal conductor or conductors with thickness between 8 μm and 20 μm. The resulted inductor can have any combination of the bottom width, insulation structure height, and metal conductor thickness from the ranges specified here, respectively. To realize low DC loss, the conductor thickness should be as large as possible in the specified range, while considering the manufacturability limitation of a particular semiconductor fabrication process. Conversely, the height of the trapezoidal insulation structure should be chosen as small as possible in the specified range to achieve the high inductance possible, while satisfying manufacturability of a given fabrication process and providing sufficient electrical insulation between metal conductors and magnetic thin film layers.

According to embodiments of the present application, a footprint of the insulation layer has a ratio of length to width in the range between 2 and 10. To realize an inductor, a bottom magnetic thin film and an upper magnetic thin film are deposited to enclose the insulation structure and conductors passing through it. These magnetic thin films need possess magnetic anisotropy, and magnetic easy axis needs align with longitudinal direction of the insulation structure. The ratio of length to width between 2 and 10 can enhance the needed magnetic anisotropy using geometry characteristics.

According to embodiments of the present application, a radius of the arched upper surface is at least 4 times greater than a radius of the at least one rounded corner. For example, a radius of the arched upper surface is at least 4, 5, or 6 times greater than a radius of the at least one rounded corner. This dimensional relationship is due to the implied ratio of bottom width to height of the trapezoidal like insulation structure. With the increased radius ratio between top surface and rounded corner, the top surface possesses less steep transition from the highest point toward the edge. Therefore, the effect of the gravitational force upon magnetic anisotropy can be greatly reduced. This is to ensure the desired magnetization polarity of magnetic thin film.

According to embodiments of the present application a profile of the arched upper surface is close to an elliptical arc. Because the specified bottom width is always much larger than the height of the trapezoidal like insulation structure, the settling time specified for the process in FIG. 1 ensures that there is no excessive extra photo-acid mass diffusing into the region above the top surface, and an elliptical arc profile can be generated.

According to embodiments of the present application, the polymer structure is made of cured photoresist material, and the polymer structure is fabricated by forming a first photoresist layer, through which at least one conductive wire structure passes, over the first magnetic material layer; performing a pattern definition with lithography on the first photoresist layer; coating a second photoresist layer over the at least one conductive wire structure passes and the dielectric layer; performing settlement for a first preset duration after coating the second photoresist layer; developing the first photoresist layer and the second photoresist layer.

According to embodiments of the present application, the first preset duration ranges from 1 hour to 3 hours to allow sufficient diffusion of photo-acid molecules, produced by the selectively exposed portion on the first photoresist layer, toward unexposed region of the first photoresist layer and second layer of photoresist. The region with photo-acid results in cross-linked photoresist or partially cross-linked photoresist. The subsequent developing step dissolves all uncross-linked photoresist, and the remaining micro-structure with curved surface is the wanted insulation structure.

According to embodiments of the present application, the dielectric layer is made of photoresist material. Certainly, the dielectric layer may also be not photoresist material.

The fabricated inductive structures may be used in various microelectronic circuits such as voltage regulators, RF circuits, EMI mitigation circuits, etc. One of embodiments of the present application is a single phase or multi-phase switching regulator or DC-DC voltage converter. The inductor is the essential energy storage element in the circuit, and forms the output filter with additional output capacitor. Such switching regulator provides needed clean and stable supply voltage to the targeted circuit modules, such as microprocessor, microprocessor processing core, memory module, etc. Another embodiment is a multiphase switching voltage regulator that incorporates multiple integrated micro inductors. Such multiphase voltage regulator is to realize higher response bandwidth to load current change from supplied circuit module, and greatly suppressed ripple noise in voltage rail. Additionally, multiphase switching voltage regulator is capable of handling large current load while maintaining stable supply voltage, and is important for nowadays high performance computing platform, such as servers, desktop computer, laptop computer, tablet, and smartphones. With integrated micro inductors, multiphase switching voltage regulators can be realized with greatly reduced footprint, and becomes attractive to be integrated into continuously shrinking form factor of end-user devices.

According to embodiments of the present application, integrated inductors or transformers may be realized by forming magnetic material layers and insulation material layers on a given substrate in certain order. Such substrate may be package substrate, silicon wafer, or silicon wafer with active transistor circuits.

According to embodiments of the present application, the inductor structure may be integrated inductors and transformers implemented on top of silicon wafer.

According to embodiments of the present application, multiple IVR modules, which utilizes multiple integrated inductors, may be incorporated into a complex multicore microprocessor. The IVR modules enables distributed power supply and power management to achieve power savings and performance improvement.

Benefits of the present application include methods of fabricating trapezoid like polymer prism with arched upper surface to ensure uniform magnetic film deposition for achieving maximized inductance of inductive devices used in integrated circuits. Inductive devices such as inductors and transformers may be fabricated according to the embodiments of the present application. Circuits such as switching voltage regulators and integrated voltage regulators may be fabricated using on-die and/or on package integrated inductors/transformers with magnetic materials according to the embodiments of the present application, and such microelectronic circuits may be utilized in server, networking processor, routers, and mobile applications, for example. Integrated voltage regulators including those used in multicore processors that need partitioned power domain power delivery and power management may benefit from the use of the structures according to embodiments of the present application.

Figure 2:
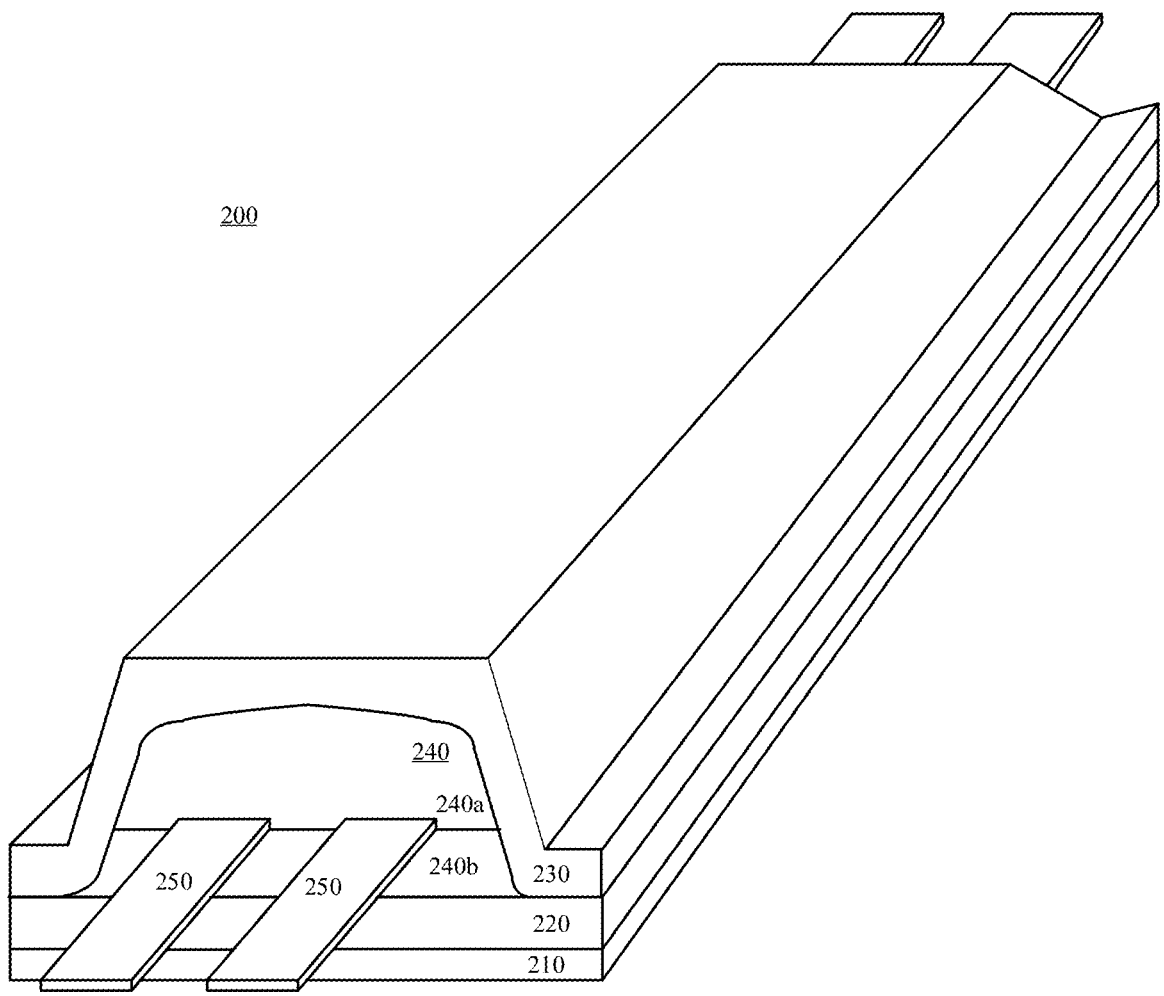
FIG. 2 is a structural diagram of an inductor structure according to another embodiment of the present application.

FIG. 2 is a structural diagram of an inductor structure 200 according to another embodiment of the present application.

Referring to FIG. 2, the inductor structure 200 may include a first magnetic material layer 220, a second magnetic material layer 230, and an insulation layer 240 disposed between the first magnetic material layer 220 and the second magnetic material layer 230. The inductor structure 200 may further include at least one conductive wiring structure 250 which passes through the insulation layer 240.

The insulation layer 240 may be a long trapezoid like prism structure, for example, a long mesa structure with an arched cross-sectional profile. For example, the insulation layer 240 may have an arched upper surface, a flat bottom surface, a first side surface and a second side surface similar to those in the insulation layer 140 as illustrated in FIG. 1. The insulation layer 240 may also have a first rounded corner transition, a second rounded corner transition, a third rounded corner transition and a fourth rounded corner transition similar to those of the insulation layer 140 as illustrated in FIG. 1, and will not be repeated herein.

In addition, the insulation layer 240 may include a first insulation material layer 240a and a second insulation material layer 240b. The first insulation material layer 240a and the second insulation material layer 240b may include the same material, for example, cured photoresist material. Alternatively, the first insulation material layer 240a and the second insulation material layer 240b may have different materials, for example, the first insulation material layer 240a may be cured photoresist material, while the second insulation material layer 240b may be made of another photosensitive polymer material. Alternatively, as another embodiment, the second insulation material layer 240b may be a thin dielectric layer which is not photosensitive polymer material.

For example, the at least one conductive wiring structure 250 may be disposed on the first insulation material layer 240a and the second insulation material layer 240b may be disposed over the first insulation material layer 240a and the at least one conductive wiring structure 250.

Additionally, the inductor structure 200 may further include a substrate 210, and the first magnetic material layer 220 is disposed on the substrate 210. For example, the first magnetic material layer 220 may be fabricated on a surface of a silicon wafer using a conventional commercial semiconductor manufacture line. Alternatively, the substrate 210 may be a printed circuit board in an electronic device.

Figure 3:
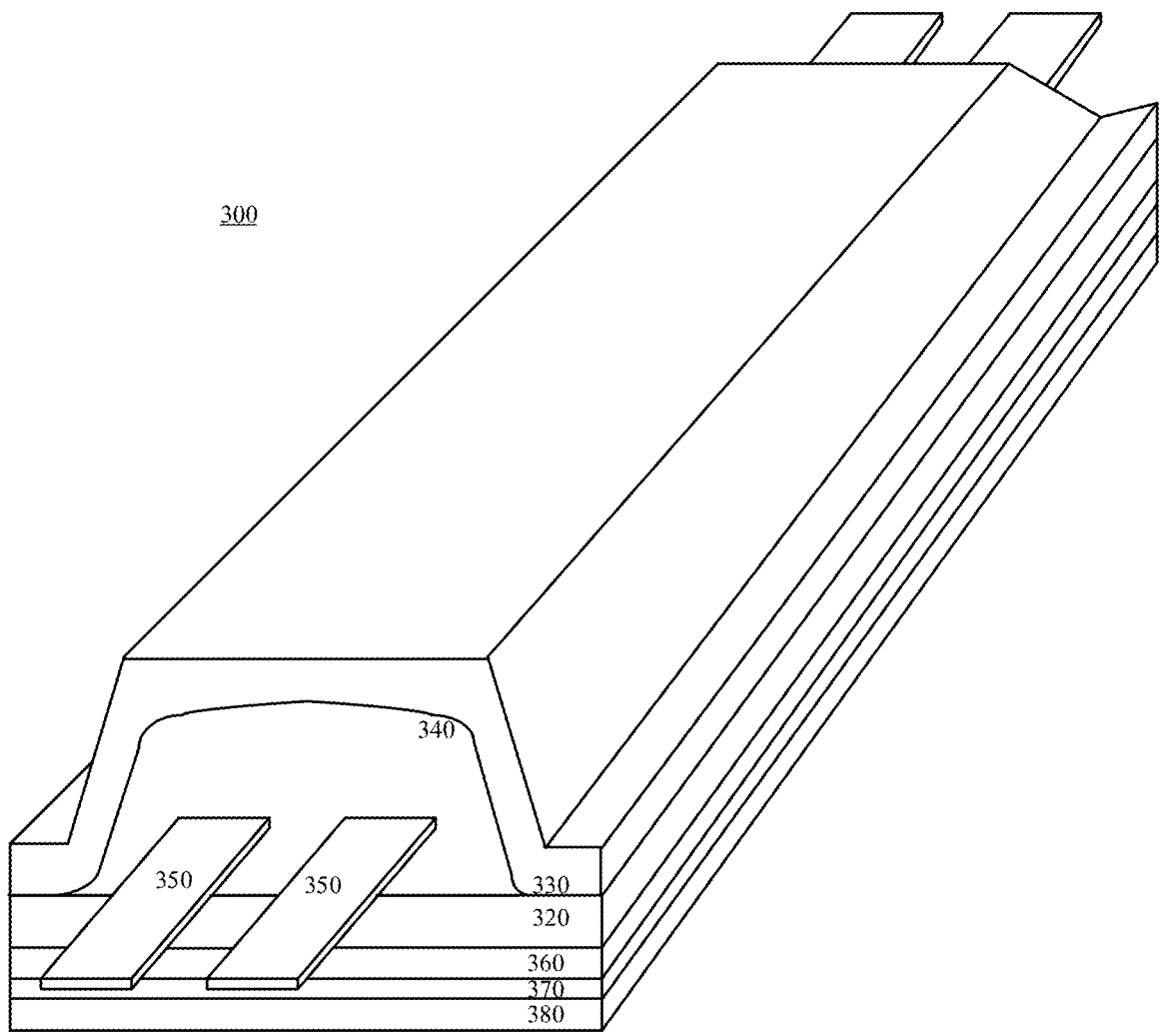
FIG. 3 is a structural diagram of an inductor structure according to another embodiment of the present application.

FIG. 3 is a structural diagram of an inductor structure 300 according to another embodiment of the present application.

The inductor structure 300 may include a first magnetic material layer 320, a second magnetic material layer 330, an insulation layer 340 and at least one conductive wiring structure 350 which are similar to a first magnetic material layer 120, a second magnetic material layer 130, an insulation layer 140 and at least one conductive wiring structure 150, respectively as described in the embodiment of FIG. 1, and will not be described repeatedly herein.

Referring to FIG. 3, the inductor structure 300 may further include a first conductor 360 of a thin film capacitor, a second conductor 380 of the thin film capacitor, a dielectric layer 370 of the thin film capacitor between the first conductor 360 and the second conductor 380. The first magnetic material layer 320 is formed on the first conductor 360.

It should be noted that the insulation layer 340 may also include a first insulation material layer and a second insulation material layer as described in the embodiment of FIG. 2.

Figure 4:
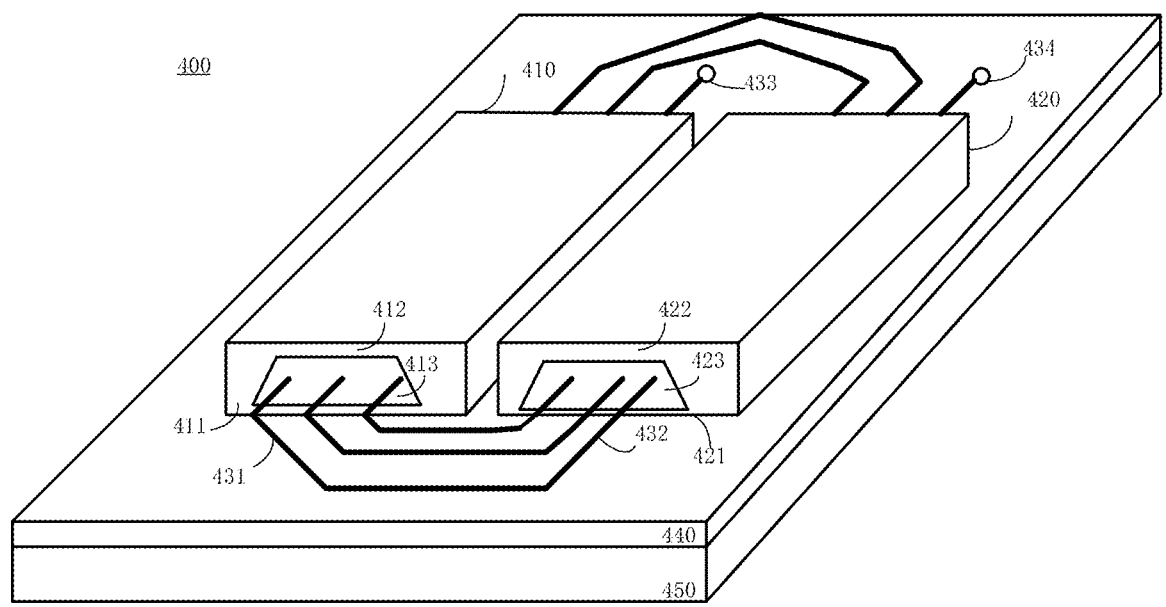
FIG. 4 is a structural diagram of an inductor structure including multiple inductors according to another embodiment of the present application.

FIG. 4 is a structural diagram of an inductor structure 400 including multiple inductors according to another embodiment of the present application. The present embodiment is described by taking an inductor structure including two inductors as an example.

The inductor structure 400 may include an inductor 410, an inductor 420, an insulator 440 and a silicon substrate 450. Each of the inductor 410 and the inductor 420 may include an inductor structure as described in the above embodiments. For example, the inductor 410 may include a first magnetic material layer 411, a second magnetic material layer 412, and an insulation layer 413 disposed between the first magnetic material layer 411 and the second magnetic material layer 412. The inductor 410 may further include a conductive wiring structure 431 which passes through the insulation layer 413. Similarly, the inductor 420 may include a first magnetic material layer 421, a second magnetic material layer 422, and an insulation layer 423 disposed between the first magnetic material layer 421 and the second magnetic material layer 422. The inductor 420 may further include a conductive wiring structure 432 which passes through the insulation layer 423. In addition, the conductive wiring structure 432 is connected to the conductive wiring structure 431 in serial as illustrated in FIG. 4. The conductive wiring structure 431 is connected to a first terminal 433 of the inductor structure 400, and the conductive wiring structure 432 is connected to a second terminal 434 of the inductor structure 400.

The insulator 440 may be disposed on the silicon substrate 450, and the inductor 410 and the inductor 420 may be disposed on the insulator 440.

It should be noted that, in FIG. 4, the structure of the insulation layer 423 is shown as a trapezoidal prism structure and the structure of the first magnetic material layer 421 and the second magnetic material layer is show as a rectangle structure just for illustration purpose, and the structure of each of the inductors is similar to that of the inductor in the above embodiments.

Figure 5:
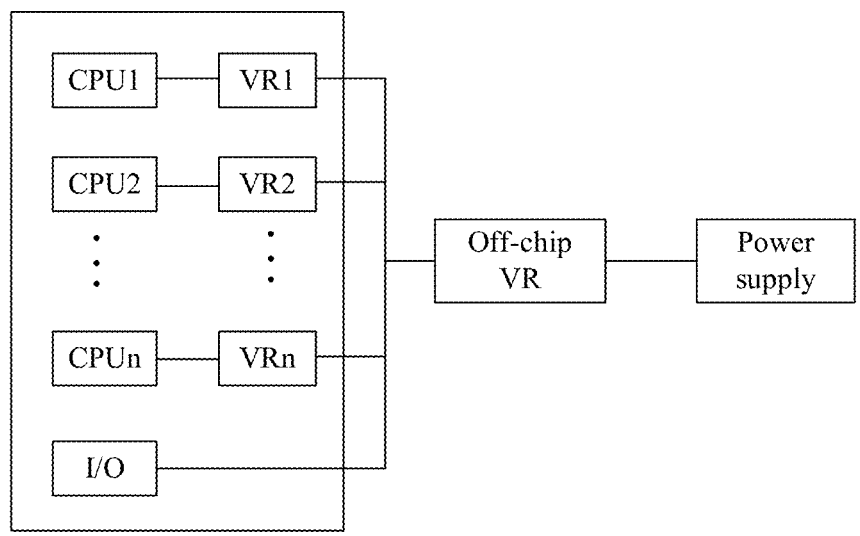
FIG. 5 illustrates a schematic architecture of a multicore microprocessor system according to another embodiment of the present application.

FIG. 5 illustrates a schematic architecture of a multicore microprocessor system according to another embodiment of the present application.

Referring to FIG. 5, the multicore microprocessor system includes multiple CPU1-n, Input/Output (I/O), multiple integrated voltage regulator (IVR)1-n, an off-chip VR and a power supply. The CPU1-n are connected to IVR1-n, respectively. IVR1-n and I/O are connected to Off-chip IVR. The Off-chip IVR is connected to power supply. The IVR may be implemented close to processor core modules, and achieves per core independent voltage supplies. This essentially enables high granularity of power management, and significant power savings of the system. An example of this embodiment may achieve an application processor of smartphone with IVR circuits using integrated inductors. For example, an IVR circuit may include an integrated inductor, a capacitor, a transistor and a resistance. Additional battery life savings may be achieved from utilizing the IVR.

Figure 6:
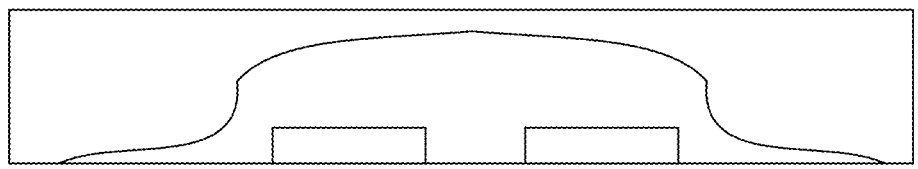
FIG. 6 is a cross section view of the inductor structure according to an embodiment of the present application.
Figure 7:
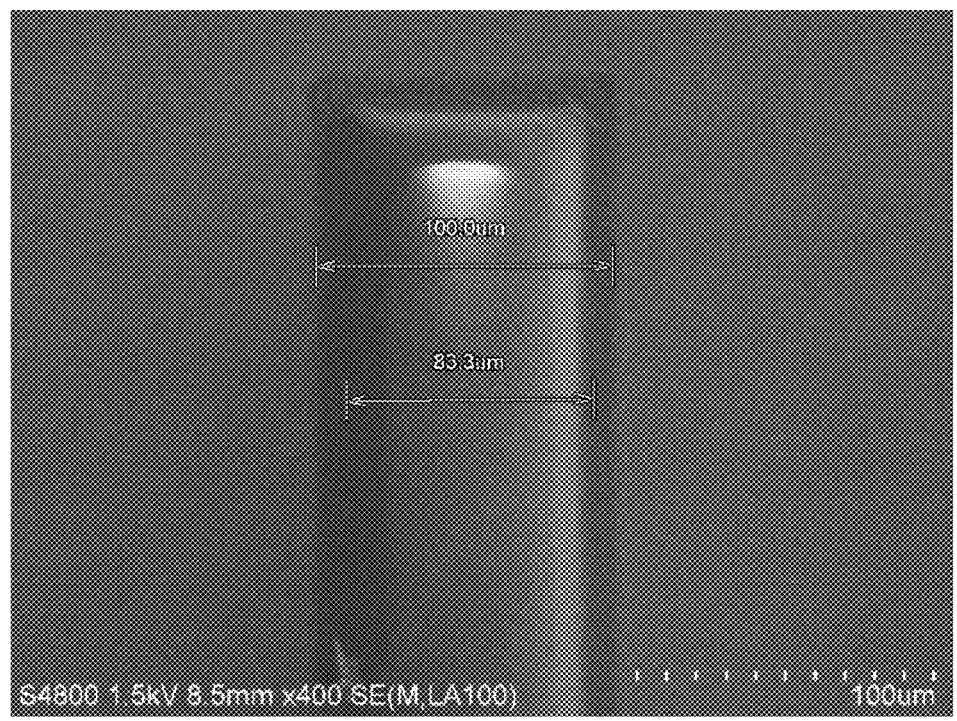
FIG. 7 is a top view of the insulation layer of the inductor structure according to an embodiment of the present application.

FIG. 6 is a cross section view of the inductor structure according to an embodiment of the present application. FIG. 7 is a top view of the inductor structure according to an embodiment of the present application. Referring to FIG. 6 and FIG. 7, images of the inductor structure captured by a scanning electric mirror show that the insulation layer in the inductor structure is a trapezoid like prism structure and thus the inductor structure is also a trapezoid like prism structure, and the insulation layer in the inductor structure have an arched top surface, convex rounded corner transition between the arched top surface and side surfaces of the insulation layer, and concave portions between the bottom surface and the side surface, which ensures smooth film deposition and magnetic characteristics.

An inductive device according to embodiments of the present application includes at least one inductor structure according to embodiments of the present application.

Figure 8:
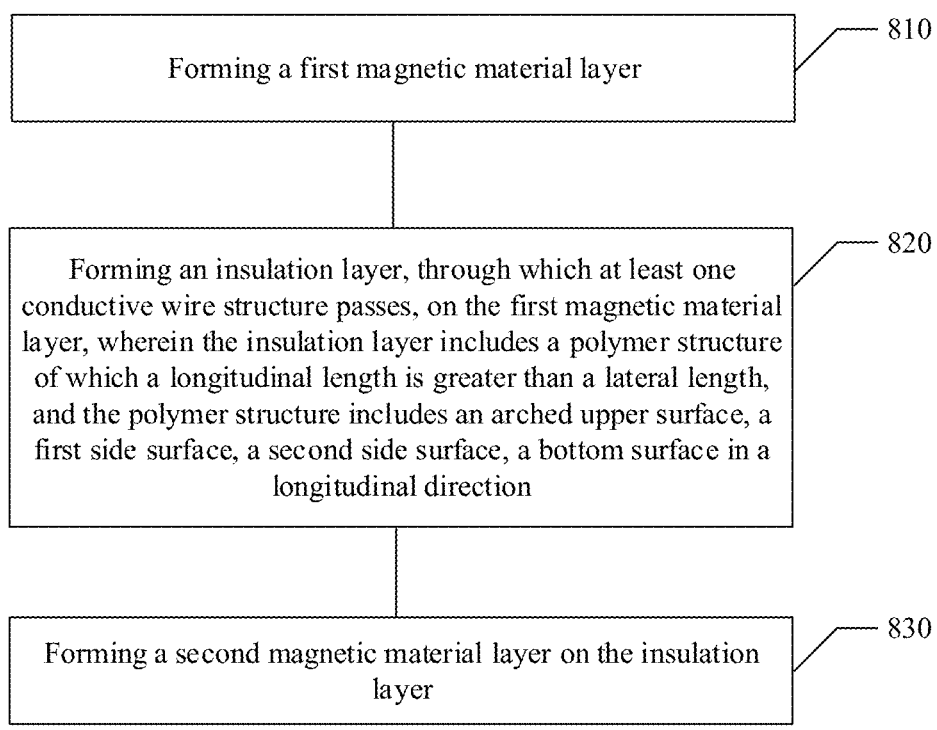
FIG. 8 is a schematic flow chart illustrating a method for fabricating an inductor structure according to an embodiment of the present application.

FIG. 8 is a schematic flow chart illustrating a method for fabricating an inductor structure according to another embodiment of the present application. The method may be used for fabricating inductor structures as described in the above embodiments. The method includes the following contents.

810, Forming a first magnetic material layer.

820, Forming an insulation layer, through which at least one conductive wire structure passes, on the first magnetic material layer, wherein the insulation layer includes a polymer structure of which a longitudinal length is greater than a lateral length, and the polymer structure includes an arched upper surface, a first side surface, a second side surface, a bottom surface in a longitudinal direction, wherein at least one of a corner between the arched upper surface and the first side surface and a corner between the arched upper surface and the second side surface is a rounded corner, and at least one of an angle formed between the first side surface and the bottom surface and an angle formed between the second side surface and the bottom surface is less than 90 degree.

830, Forming a second magnetic material layer on the insulation layer.

According to embodiments of the present application, the inductor structure has two magnetic thin film layers supported by a long trapezoid like prism structure which has an arched upper surface and rounded corner transition. Since the long trapezoid like prism structure is formed without utilizing thermal reflow, achieving high inductance of an integrated inductor or transformer effectively.

According to embodiments of the present application, step 820 includes: forming an insulation layer, through which at least one conductive wire structure passes, on the first magnetic material layer; forming a first photoresist layer, through which at least one conductive wire structure passes, over the first magnetic material layer; performing a pattern definition with lithography on the first photoresist layer; coating a second photoresist layer over the at least one conductive wire structure passes and the dielectric layer; developing the first photoresist layer and the second photoresist layer.

Optionally, as another embodiment, the method further includes: performing settlement for a second preset duration after coating the second photoresist layer and before developing.

Optionally, as another embodiment, the first preset duration ranges from 1 hour to 3 hours.

Optionally, as another embodiment, the method further includes: forming a dielectric layer on the first magnetic material layer, wherein the forming a first photoresist layer, through which at least one conductive wire structure passes, over the first magnetic material layer includes: forming at least one conductive wire structure passes on the dielectric layer; coating a first photoresist layer over the at least one conductive wire structure passes and the dielectric layer.

Figure 9:
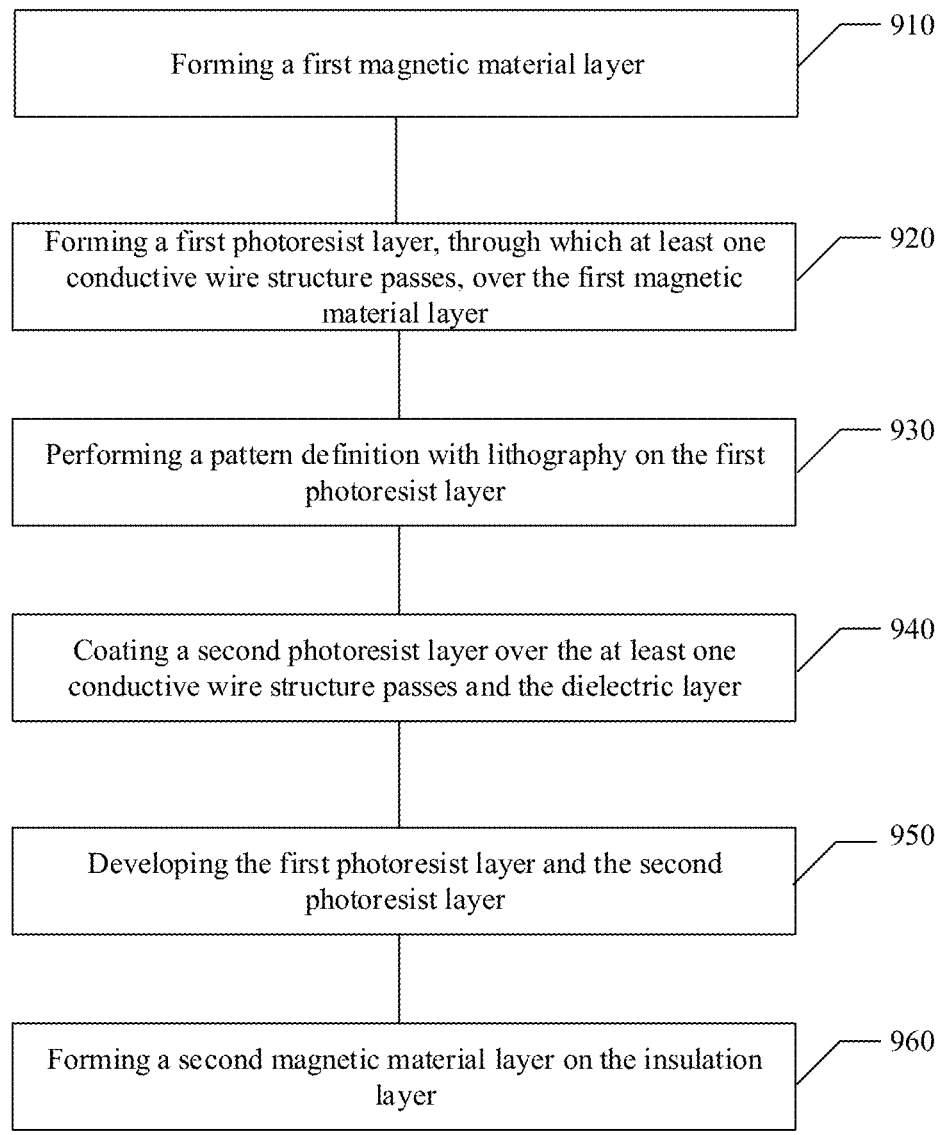
FIG. 9 is a schematic flow chart illustrating a method for fabricating a trapezoidal polymer prism with curved top surface using photoresist according to another embodiment of the present application.

FIG. 9 is a schematic flow chart illustrating a method for fabricating an inductor structure according to an embodiment of the present application. The method may be used for fabricating inductor structures as described in the above embodiments. The method includes the following contents.

910, Forming a first magnetic material layer.

920, Forming a first photoresist layer, through which at least one conductive wire structure passes, over the first magnetic material layer.

930, Performing a pattern definition with lithography on the first photoresist layer;

940, Coating a second photoresist layer over the at least one conductive wire structure passes and the dielectric layer.

950, Developing the first photoresist layer and the second photoresist layer.

960, Forming a second magnetic material layer on the insulation layer.

According to embodiments of the present application, the inductor structure has two magnetic thin film layers supported by a long trapezoid like prism structure which has an arched upper surface and rounded corner transition. Since the long trapezoid like prism structure is formed without utilizing thermal reflow, achieving high inductance of an integrated inductor or transformer effectively.

Optionally, as another embodiments, the method further includes: performing settlement for a second preset duration after coating the second photoresist layer and before developing.

According to embodiments of the present application, the first preset duration ranges from 1 hour to 3 hours.

Optionally, as another embodiments, the method further includes: forming a dielectric layer on the first magnetic material layer, and step 920 includes: forming at least one conductive wire structure passes on the dielectric layer, coating a first photoresist layer over the at least one conductive wire structure passes and the dielectric layer.

According to embodiments of the present application, the dielectric layer is made of cured photoresist material.

According to embodiments of the present application, the rounded corner is convex and/or the portions of the first side surface and the second side surface close to the bottom surface are concave.

According to embodiments of the present application, a ratio of bottom width to height of a cross section of the polymer structure is greater than or equal to 3.

According to embodiments of the present application, the height of the cross section is greater than or equal to 10 μm.

According to embodiments of the present application, polymer structure has a glass transition temperature greater than 200 degree Celsius after polymerization.

According to embodiments of the present application, a footprint of the insulation layer has a ratio of length to width greater than or equal to 1.5.

According to embodiments of the present application, a radius of the arched upper surface is at least 4 times greater than a radius of the at least one rounded corner.

According to embodiments of the present application, a profile of the arched upper surface is one of a segmental arc and an elliptical arc.

Figure 10:
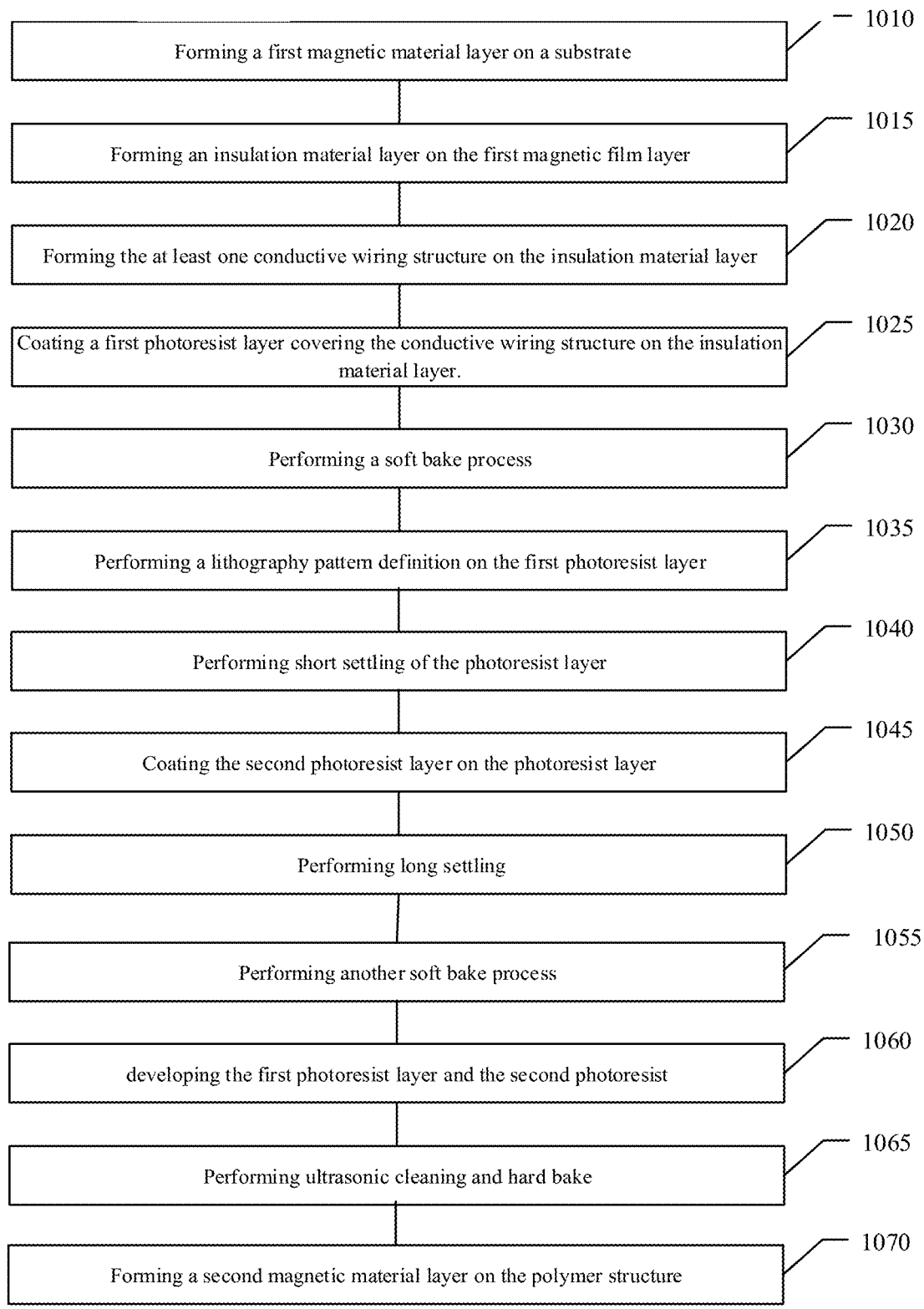
FIG. 10 is a schematic process for fabricating an inductor structure according to an embodiment of the present application.

FIG. 10 is a schematic process for fabricating an inductor structure according to an embodiment of the present application. The process may be used for fabricating inductor structures as described in the above embodiments. The method includes the following contents.

1010, Forming a first magnetic material layer on a substrate.

For example, the substrate may be a silicon wafer or a printed circuit board. The embodiment may be described by taking a wafer as an example. In addition, before coating, a substrate preparation, for example, cleaning and pre-baking process may be performed, and may be accomplished by one or more of the following processes: substrate cleaning to remove contamination, dehydration bake to remove water, and addition of an adhesion promote. The substrate preparation may improve the adhesion of material, for example, cured photoresist material or the insulation material to the substrate.

The first magnetic material layer may be formed on the substrate by utilizing deposition techniques such as sputtering, electroplating, or chemical vapor deposition (CVD). For example, the first magnetic material layer may be sputtered on the substrate.

1015, Forming an insulation material layer on the first magnetic film layer for insulating the first magnetic film layer from at least one conductive wiring structure.

Specifically, the insulation material layer may be a thin dielectric layer. For example, the insulation material layer may be coated on the first magnetic material layer. The insulation material layer may include any suitable material, including silicon oxide, sapphire, other suitable insulating materials, and/or combinations thereof. The insulation layer is formed by any suitable process, such as implantation, oxidation, deposition, and/or other suitable process. Alternatively, the insulation layer may also be cured photoresist material.

1020, Forming the at least one conductive wiring structure on the insulation material layer.

For example, the at least one conductive wiring structure on the insulation material layer may be formed through a conventional metal etching process. The conductive wire structure may include any suitable conductive material, such as aluminum, copper, titanium, tantalum, tungsten, molybdenum, tantalum nitride, nickel silicide, cobalt silicide, TiN, WN, TiAl, TiAlN, TaCN, TaC, TaSiN, metal alloys, and/or combinations thereof.

1025, Coating a first photoresist layer covering the conductive wiring structure on the insulation material layer.

The first photoresist layer may be formed by any suitable process to any suitable thickness. The coating technique may include spin-coating, spray-coating, dip-coating, flow-coating, vacuum deposition (e.g., physical vapor deposition or chemical vapor deposition), evaporation, or lamination, etc.

For example, a thin, uniform coating of photoresist may be accomplished by a process of spin coating. The photoresist may be obtained by dissolving solid components in a solvent and poured onto the insulation material layer, which is then spun on a turntable at a high speed, thus producing a desired film. At the end of coating, film of photoresist covers the wafer, ready for soft bake.

1030, Performing a soft bake process.

The soft bake, also called prebake or post-apply bake, involves drying the photoresist after spin coat by removing this excess solvent, for example, is used to evaporate the volatile solvent in the photoresist, and make the photoresist into a solid, enhancing the adhesion force of the photoresist. There are several methods that can be used to bake photoresists, for example, oven bake, hotplate baking and proximity baking. After soft bake, the wafer is cooled. After cooling, the wafer is ready for its lithographic exposure.

1035, Performing a lithography pattern definition on the first photoresist layer.

Contact and proximity lithography are the simplest methods of exposing a photoresist (for example, a negative photoresist) through a master pattern called a photomask, and a conventional method of exposure is projection printing in which an image of the mask is projected onto the wafer. There are two major classes of projection lithography tools—scanning and step-and-repeat systems.

Figure 11:
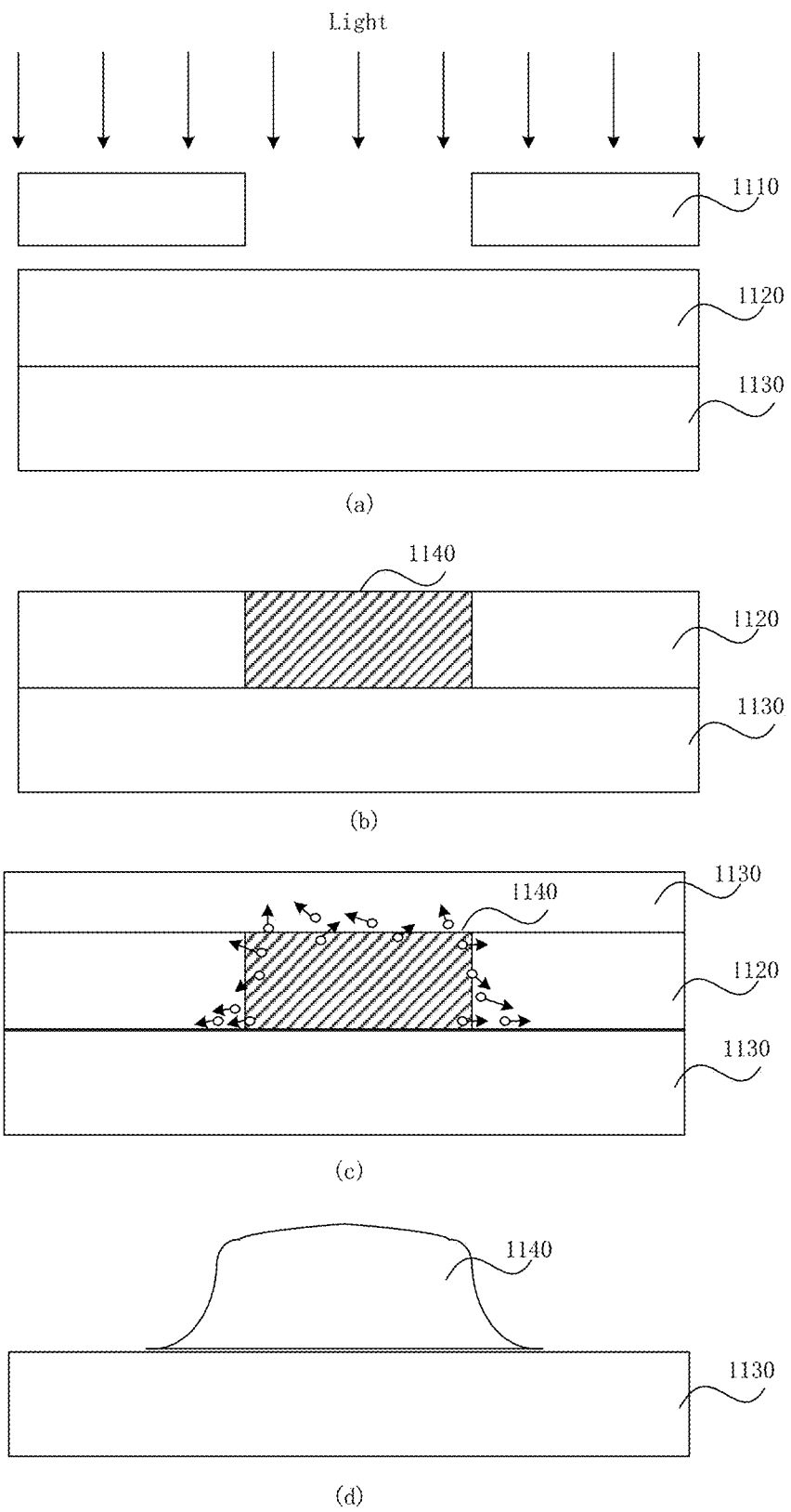
FIG. 11 schematically illustrates a process for fabricating the polymer structure in the inductor structure according to an embodiment of the present application.

FIG. 11 schematically illustrates a process for fabricating the polymer structure in the inductor structure according to an embodiment of the present application. The embodiment of the present application is described by taking a photoresist structure as an example. Referring to FIGS. 11 (a) and (b), an image of the mask 1110 is aligned with the previously defined patterns on the wafer, and the photoresist 1120 is exposed to the light with the image of the mask 1110. After the lithography pattern definition, an exposed photoresist structure 1140 may be obtained.

1040, Performing short settling of the photoresist layer after the lithography pattern definition.

For example, after the lithography pattern definition, the wafer is stood for a preset duration and the duration is in the range of 20 minutes to 60 minutes, for example, 40 minutes.

1045, Coating the second photoresist layer on the photoresist layer. After the short settling, the second photoresist layer is coated on the first photoresist layer.

The coating step may be performed in a manner as described in step 1025, and will not be repeated herein.

1050, Performing long settling after the second photoresist layer is coated. The duration of this settling step is in the range of 60 minutes to 180 minutes, for example, 90 minutes.

Referring to FIG. 11(c), during the long settling, mutual diffusion of elements occurs between the coating photoresist layer (the second photoresist layer) and the exposed photoresist layer (the first photoresist). Specifically, a part of molecules of the exposed photoresist layer, for example, molecules close to the coating photoresist layer diffuses into the coating photoresist layer, and a part of molecules of the coating photoresist layer, for example, molecules close to the exposed photoresist layer diffuses into the exposed photoresist layer.

1055, Performing another soft bake process. After the long settling, another soft take process may be performed in a manner as described in step 1030.

1060, developing the first photoresist layer and the second photoresist to remove unwanted portion.

1065, Performing ultrasonic cleaning and hard bake to obtain a photoresist structure.

Referring to FIG. 11 (d), the molecules of the exposed photoresist are soluble in the basic developer, and the molecules of the unexposed photoresist are insoluble in the basic developer, thus resulting in the polymer structure as described in the above embodiment.

1070, Forming a second magnetic material layer on the photoresist structure.

The magnetic material layer described in previous embodiment of integrated inductors or transformers can be made of nano-crystalline or amorphous magnetic alloys such as NiFe, CoZrTa, CoZrNb, CoP, CoPb, CoZr, FeCoO, FeCoP, FeCoBSi, and combinations thereof. The first and second magnetic layer described in the embodiment of integrated inductors and transformers may be in form of laminated thin magnetic film layers with insulation layers in between. The insulation layer material may be silicon oxide, $Al_2O_3$, or The first and second magnetic material layers forming integrated inductors and transformers may utilize deposition techniques such as sputtering, electroplating, or chemical vapor deposition (CVD). In one embodiment of the present application, sputtering a thin titanium, tantalum, TiN film, or combinations prior to depositing the first and second magnetic layer may be performed to increase magnetic film adhesion.

According to embodiments of the present application, the inductor structure may be fabricated by coating photoresist on the wafer surface, soft baking photoresist, lithography definition of structure pattern, coating additional layer of photoresist, settling the wafer for some desired duration, having second round soft baking, developing the photoresist to remove unwanted portion, and having hard baking on the remaining polymerized photoresist. The resulted polymer structures have distinguished trapezoid like profile, curved top surface, and rounded corner angle transitions. This profile characteristic enables uniform film deposition of magnetic layer over the raised 3D structures, and is critical to ensure high inductance and electrical performance of fabricated inductors and transformers.

According to embodiments of the present application, a trapezoidal prism structure with a curved top surface is formed, which enables the fabrication of integrated micro inductor or transformer structures utilizing raised 3D prism with smooth surface transition to ensure uniform film deposition of magnetic layers, thus achieving good inductance and consequently electrical performance of a microelectronic device.

It may be clearly understood by a person skilled in the art that, for the purpose of convenient and brief description, for a detailed working process of the foregoing system, device, and unit, reference may be made to a corresponding process in the foregoing method embodiments, which will not be repeated herein.

A person skilled in the art in the art may make modifications to the specific implementation and application scope of the present application based on the embodiments of the present application. Therefore, the content of the specification shall not be construed as a limitation on the present application.

The invention claimed is:

1. An inductor structure, comprising:
a first magnetic material layer;
an insulation layer formed on the first magnetic material layer, wherein the insulation layer comprises a polymer structure of which a longitudinal length is greater than a lateral length, wherein the polymer structure comprises an arched upper surface, a first side surface, a second side surface, and a bottom surface in a longitudinal direction, wherein at least one of a corner between the arched upper surface and the first side surface and a corner between the arched upper surface and the second side surface is a rounded corner, and wherein at least one of an angle formed between the first side surface and the bottom surface and an angle formed between the second side surface and the bottom surface is less than 90 degree;
at least one conductive wire structure which passes through the insulation layer; and
a second magnetic material layer formed on the insulation layer.

2. The inductor structure of claim 1, wherein at least one of the rounded corner is convex or portions of the first side surface and the second side surface close to the bottom surface are concave.

3. The inductor structure of claim 1, wherein a ratio of bottom width to height of a cross section of the polymer structure is greater than or equal to 3.

4. The inductor structure of claim 3, wherein the height of the cross section is greater than or equal to 10 µm.

5. The inductor structure of claim 1, wherein a footprint of the insulation layer has a ratio of length to width greater than or equal to 1.5.

6. The inductor structure of claim 1, wherein a radius of the arched upper surface is at least 4 times greater than a radius of at least one of the rounded corner.

7. The inductor structure of claim 1, wherein a profile of the arched upper surface is one of a segmental arc and an elliptical arc.

8. The inductor structure of claim 1, wherein the polymer structure is made of cured photoresist material, and wherein the polymer structure is fabricated by:
forming a first photoresist layer, through which at least one conductive wire structure passes, over the first magnetic material layer;
performing a pattern definition with lithography on the first photoresist layer;
coating a second photoresist layer over the at least one conductive wire structure and a dielectric layer;
performing settlement for a first preset duration after coating the second photoresist layer; and
developing the first photoresist layer and the second photoresist layer.

9. The inductor structure of claim 8, wherein the dielectric layer is made of cured photoresist material.

10. An inductive device, comprising:
at least one inductor structure, wherein the at least one inductor structure comprises:
a first magnetic material layer;
an insulation layer formed on the first magnetic material layer, wherein the insulation layer comprises a polymer structure of which a longitudinal length is greater than a lateral length, wherein the polymer structure comprises an arched upper surface, a first side surface, a second side surface, and a bottom surface in a longitudinal direction, wherein at least one of a corner between the arched upper surface and the first side surface and a corner between the arched upper surface and the second side surface is a rounded corner, and wherein at least one of an angle formed between the first side surface and the bottom surface and an angle formed between the second side surface and the bottom surface is less than 90 degree;
at least one conductive wire structure which passes through the insulation layer; and
a second magnetic material layer formed on the insulation layer.

11. A method of forming an inductor structure, comprising:
forming a first magnetic material layer;
forming a first photoresist layer, through which at least one conductive wire structure passes, over the first magnetic material layer;
performing a pattern definition with lithography on the first photoresist layer;
coating a second photoresist layer over the at least one conductive wire structure passes and a dielectric layer;
developing the first photoresist layer and the second photoresist layer; and
forming a second magnetic material layer on an insulation layer, wherein the insulation layer is formed on the first magnetic material layer.

12. The method of claim 11, further comprising:
performing settlement for a first preset duration after coating the second photoresist layer and before developing the first photoresist layer and the second photoresist layer.

13. The method of claim 11, further comprising:
forming the dielectric layer on the first magnetic material layer, wherein the forming a first photoresist layer, through which at least one conductive wire structure passes, over the first magnetic material layer comprises:
forming at least one conductive wire structure passes on the dielectric layer; and
coating the first photoresist layer over the at least one conductive wire structure passes and the dielectric layer.

14. The method of claim 11, wherein the dielectric layer is made of cured photoresist material.

15. The method of claim 11, wherein the inductor structure has two magnetic thin film layers supported by a long trapezoid like prism structure which has an arched upper surface and rounded corner transition, and wherein at least one of a rounded corner is convex or portions of a first side surface and a second side surface close to a bottom surface are concave.

16. The method of claim 11, further comprising:
performing ultrasonic cleaning and hard bake;
removing the first photoresist layer; and
obtaining the inductor structure comprising a polymer structure, wherein a ratio of bottom width to height of a cross section of the polymer structure is greater than or equal to 3.

17. The method of claim 16, further comprising:
performing ultrasonic cleaning and hard bake;
removing the first photoresist layer; and
obtaining the inductor structure comprising a polymer structure, wherein the height of the cross section of the polymer structure is greater than or equal to 10 µm.

18. The method of claim 11, wherein a footprint of the insulation layer has a ratio of length to width greater than or equal to 1.5.

19. The method of claim 11, wherein the inductor structure has two magnetic thin film layers supported by a long trapezoid like prism structure which has an arched upper surface and rounded corner transition, and wherein a radius of the arched upper surface is at least 4 times greater than a radius of at least one rounded corner.

20. The method of claim 11, wherein the inductor structure has two magnetic thin film layers supported by a long trapezoid like prism structure which has an arched upper surface and rounded corner transition, and wherein a profile of the arched upper surface is one of a segmental arc and an elliptical arc.

* * * * *